United States Patent
Liimatta et al.

(10) Patent No.: US 8,966,971 B2
(45) Date of Patent: Mar. 3, 2015

(54) VEHICLE ENGINE WITH FLUID MEASURING SYSTEM

(75) Inventors: Gary David Liimatta, Ypsilanti, MI (US); Scott Kerry, Livonia, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 1402 days.

(21) Appl. No.: 12/180,634

(22) Filed: Jul. 28, 2008

(65) Prior Publication Data

US 2010/0018308 A1 Jan. 28, 2010

(51) Int. Cl.
*G01F 23/00* (2006.01)
*G01F 23/04* (2006.01)

(52) U.S. Cl.
CPC ..................................... *G01F 23/04* (2013.01)
USPC ....................................................... 73/290 B

(58) Field of Classification Search
CPC ................................. G01F 23/04; G01F 23/00
USPC ............................................. 73/290 V, 290 R
See application file for complete search history.

(56) References Cited

U.S. PATENT DOCUMENTS

| | | | |
|---|---|---|---|
| 3,596,687 A | | 8/1971 | Forgeron |
| 3,955,079 A | * | 5/1976 | Chapman et al. ............. 362/413 |
| 4,110,909 A | | 9/1978 | Mayr et al. |
| 4,176,457 A | | 12/1979 | Keffeler |
| 4,191,141 A | * | 3/1980 | Franke ......................... 123/65 A |
| 2004/0143985 A1 | | 7/2004 | Porter et al. |
| 2011/0011366 A1 | * | 1/2011 | Kauer et al. ............... 123/196 R |

FOREIGN PATENT DOCUMENTS

| | | | |
|---|---|---|---|
| DE | 10339364 A1 | * | 3/2005 |
| GB | 2317931 A | * | 4/1998 |
| WO | WO 2006/136295 | | 6/2006 |
| WO | WO 2007/017607 | | 2/2007 |

* cited by examiner

*Primary Examiner* — Laura Martin
*Assistant Examiner* — Alex Devito
(74) *Attorney, Agent, or Firm* — Julia Voutyras; Alleman Hall McCoy Russell & Tuttle LLP

(57) ABSTRACT

The present disclosure relates to a fluid measuring system for use in a vehicle engine. The engine includes a fluid return channel through which a tube is inserted. The fluid measuring system also includes a dipstick that can be inserted in the tube. One end of the dipstick is in fluid communication with a fluid reservoir and is configured to indicate the fluid level of the engine. The tube can be composed of an elastic material.

15 Claims, 5 Drawing Sheets

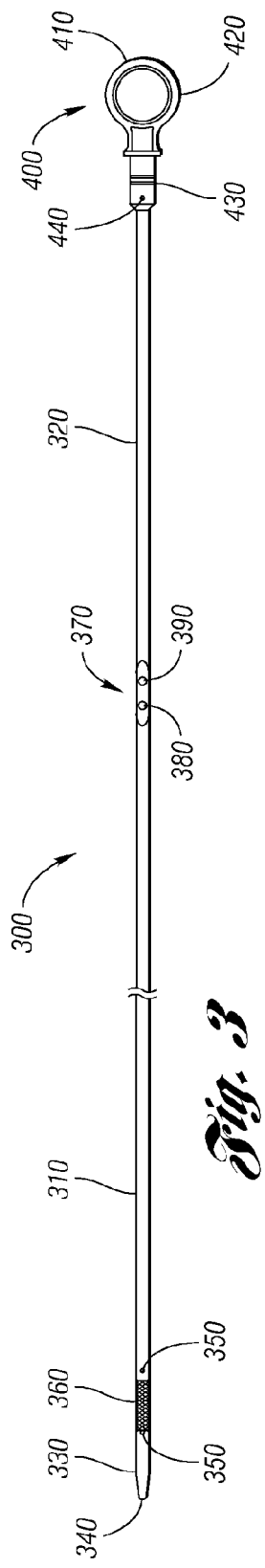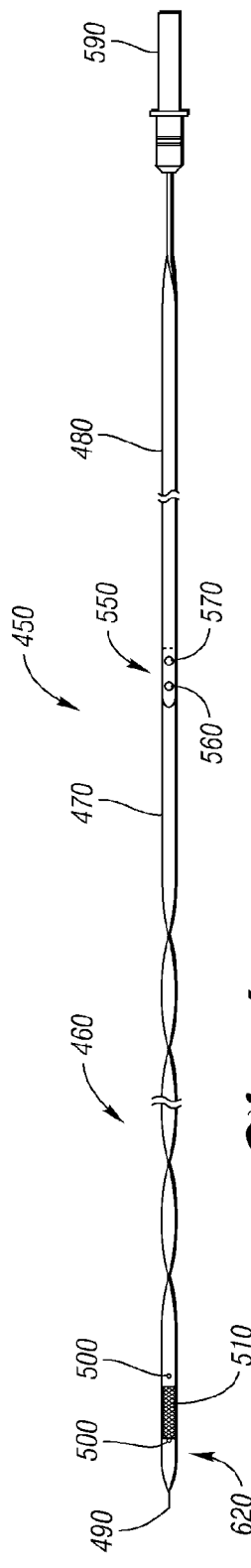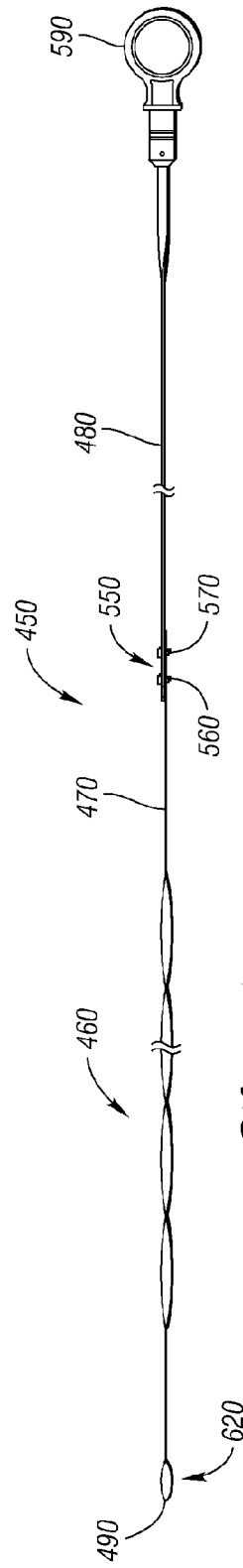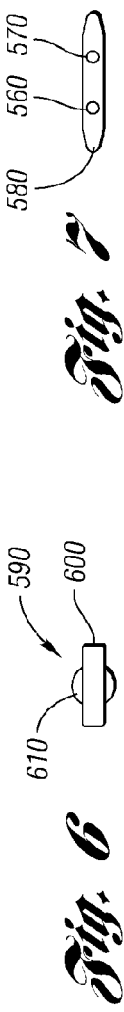

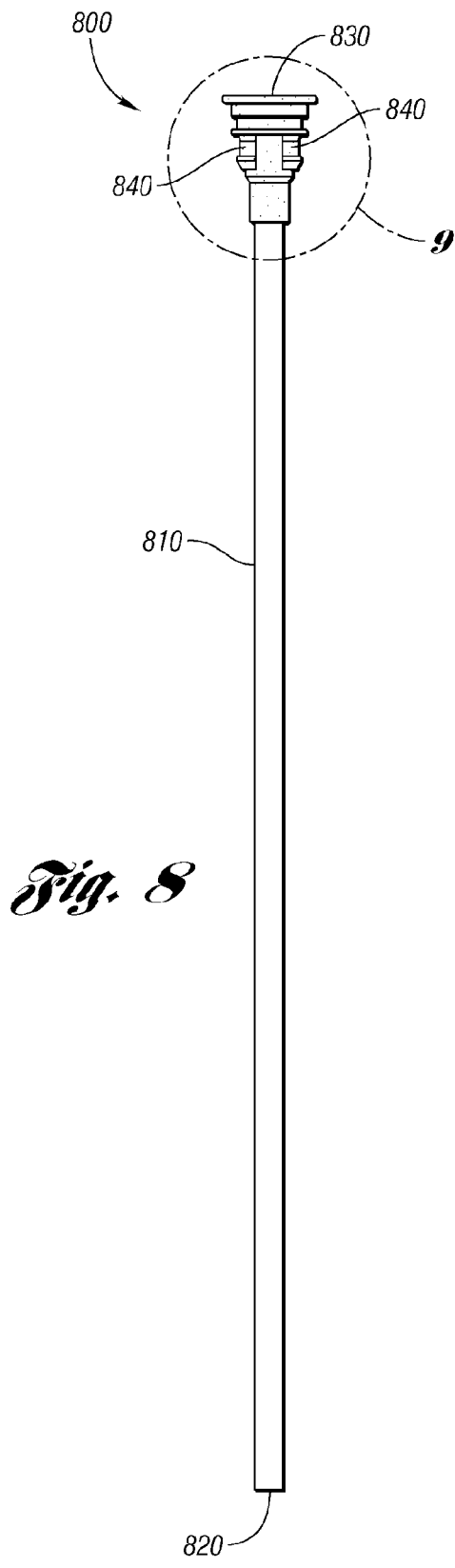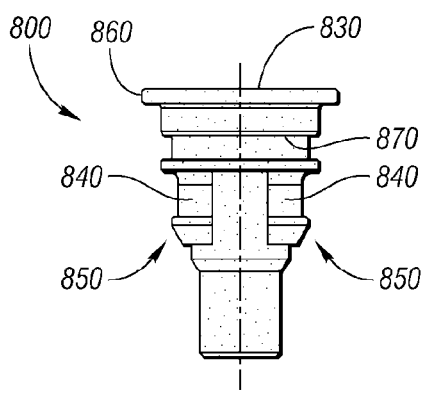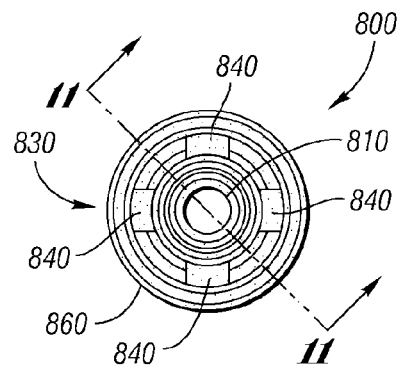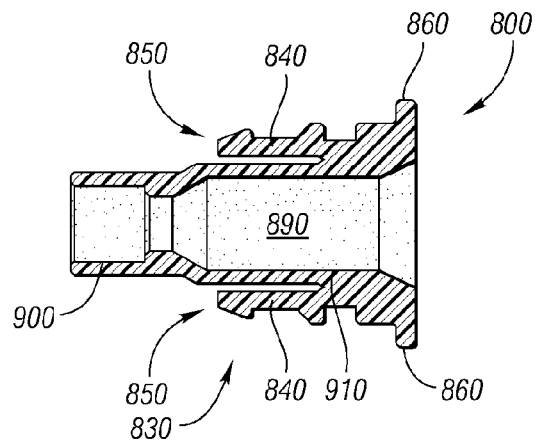

VEHICLE ENGINE WITH FLUID MEASURING SYSTEM

TECHNICAL FIELD

The present disclosure relates to a fluid level measuring system for a vehicle engine.

BACKGROUND

Conventional fluid measuring devices are configured for indicating fluid (or oil) level in a fluid sump of an internal combustion engine, transmission or other automobile components that require lubrication. Many fluid measuring devices include a dipstick that can be inserted in a cylindrical tube that is externally attached to the engine. One end of the dipstick is in fluid communication with the fluid reservoir and another end of the dipstick has a handle for removing the dipstick from the cylindrical tube.

Engines may vary in terms of the numbers of cylinders each engine includes. For example, modern vehicles include engines with in-line, V-4, V-6, V-8 and V-10 arrangements. In an in-line arrangement—such as that taught in Patent Publication No. WO2007017607 to Amiri et al. titled "Motor Vehicle Oil Dipstick Means" and Patent Publication No. WO2006136295 to Kauer et al. titled "Internal Combustion Engine Comprising an Integrated Oil Dipstick Guiding Element"—the cylinder block is arranged such that each of the cylinders are positioned along the same axis. Rather than being composed of an elastic material, the dipstick guide is composed of a rigid material. Thus, with an in-line arrangement, engine components such as a fluid indicator may easily navigate the engine assembly from the cylinder head to the fluid sump. In a V-6 arrangement, however, engine balance occurs where one set of cylinders are mounted on an axis at least 60 degrees apart from an axis in which another set of cylinders are mounted. For a V-8 arrangement engine balance occurs where one set of cylinders are mounted on an axis at least 90 degrees apart from an axis in which another set of cylinders are mounted. The position of the cylinders can make routing the fluid measuring device much more complex. Accordingly, it becomes increasingly difficult to design fluid measuring devices that can navigate various engine arrangements and their intricacies.

Therefore, it is desirable to have a fluid level measuring system that accommodates complex engine arrangements (such as V-4, V-6, V-8 and V-10 arrangements) in a cost efficient manner. It is further desirable to have a more precise and accurate fluid level measuring system than that which is provided with conventional fluid level indicators. Lastly, a fluid level measuring system that is easier and more economical to manufacture and assemble than current designs is desired.

SUMMARY

In one exemplary embodiment, a fluid measuring system for use in a vehicle engine includes a fluid return channel. The fluid return channel is configured to guide fluid from an upper portion of an engine to a fluid reservoir. The system further includes a tube configured to fit in the fluid return channel; the tube is fitted in the fluid return and continuously extends from a top of the upper portion of the engine to the fluid reservoir. A dipstick having a first and second end is included in the system. The first end of the dipstick comprises a fluid indicator and the dipstick is configured to fit in the tube. The engine includes a plurality of cylinder assemblies, mounted in a v-shaped arrangement.

In another exemplary embodiment a fluid measuring system comprises a v-type internal combustion engine and a channel bore in the engine, the channel is in fluid communication with the fluid reservoir. A tube is configured to fit in the channel; the tube is configured to continuously extend from a top of an upper portion of the engine to the fluid reservoir. A dipstick is configured to be inserted in the tube. The dipstick includes an indicator of fluid level at one end.

One advantage of the techniques included in the present disclosure is that they route the fluid measuring system internally throughout the engine thereby enabling greater commonality between parts despite different engine designs. Additionally, the fluid level indicator utilizes an already existing oil drain back; therefore, additional channels or spacing is not required to accommodate the fluid measuring system.

The present teachings require fewer manufacturing steps as they do not require forming channels to accommodate the tube and dipstick in addition to oil to drainage/ventilation channels.

Another advantage of the techniques included in the present disclosure is that they provide a simplified construction of a fluid measuring system and do not require siphoning features, dipstick/tube springs and other costly mechanical parts. Moreover, in one embodiment the fluid measuring system includes a dipstick that extends beyond the tube. The tube is not submersed in the lubricating fluid; accordingly another advantage of the techniques disclosed herein is that a tube is provided that does not require additional ventilation mechanisms.

Another advantage of the techniques included in the present disclosure is that they provide a fluid measuring system that is encased in the engine assembly and usable with a v-shaped arrangement.

The invention will be explained in greater detail below by way of example with reference to the figures. The above features and advantages and other features and advantages of the present invention are readily apparent from the following detailed description of the best modes for carrying out the invention when taken in connection with the accompanying drawings. In the figures:

BRIEF DESCRIPTION OF THE DRAWINGS

FIG. 3 is a side view of a dipstick for use with a fluid measuring system according to an exemplary embodiment.

FIG. 4 is a side view of a dipstick for use with a fluid measuring system according to another exemplary embodiment.

FIG. 5 is a side view of the dipstick of FIG. 4.

FIG. 6 is a side view of the dipstick of FIGS. 4 and 5.

FIG. 7 is a side view of a support blade for the dipstick of FIGS. 4 and 5.

FIG. 8 is a side view of a tube for use with a fluid measuring system according to an exemplary embodiment.

FIG. 9 is a side view of a fastener connected to the tube of FIG. 8.

FIG. 10 is a side view of a tube for use with a fluid measuring system according to an exemplary embodiment.

FIG. 11 is a cross-sectional view of a fastener connected to the tube of FIG. 10 through line 11-11.

DETAILED DESCRIPTION

Figure 1:
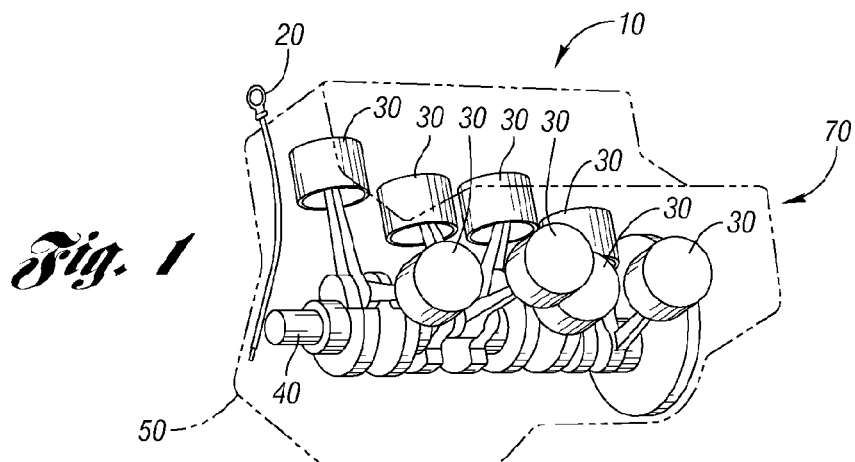
FIG. 1 is a perspective view of a vehicle engine according to an exemplary embodiment.

Referring to the drawings, FIGS. 1 through 15, wherein like characters represent the same or corresponding parts throughout the several views there is shown a vehicle engine 10 and fluid measuring system 20 for use therein. The vehicle engine 10, shown in FIG. 1, is a V-8 engine for use in an automobile. The engine 10 includes eight cylinder assemblies 30 with pistons. A first set of cylinder assemblies are angularly mounted with respect to a second set of cylinder assemblies. In one arrangement, the angle between the first set of cylinder assemblies and the second set of cylinders is 90 degrees. In another arrangement the angle between each set of cylinder assemblies is 60 degrees. The angular position of the cylinder assemblies with respect to each other can be greater than 90 degrees, less than 60 degrees or any angular position therebetween. While the engine 10 shown is a V-8, the present techniques disclosed herein may be used with various engine types including, for example, V-4, V-6, V-10 or in-line arrangements.

The engine shown in FIG. 1 includes eight cylinder assemblies 30 with pistons. Each piston is interconnected through an engine crankshaft 40. The crankshaft 40 is at least partially submersed in fluid (e.g., oil or other lubricant) to increase engine performance and overall durability of engine components. The crankshaft 40 is in fluid communication with a fluid reservoir 50 (also known as oil sump or oil pan) at the base 60 of the engine. The engine also includes a pump—not shown—configured to deliver oil to other engine components (e.g., piston heads and cylinder bores).

Figure 2:
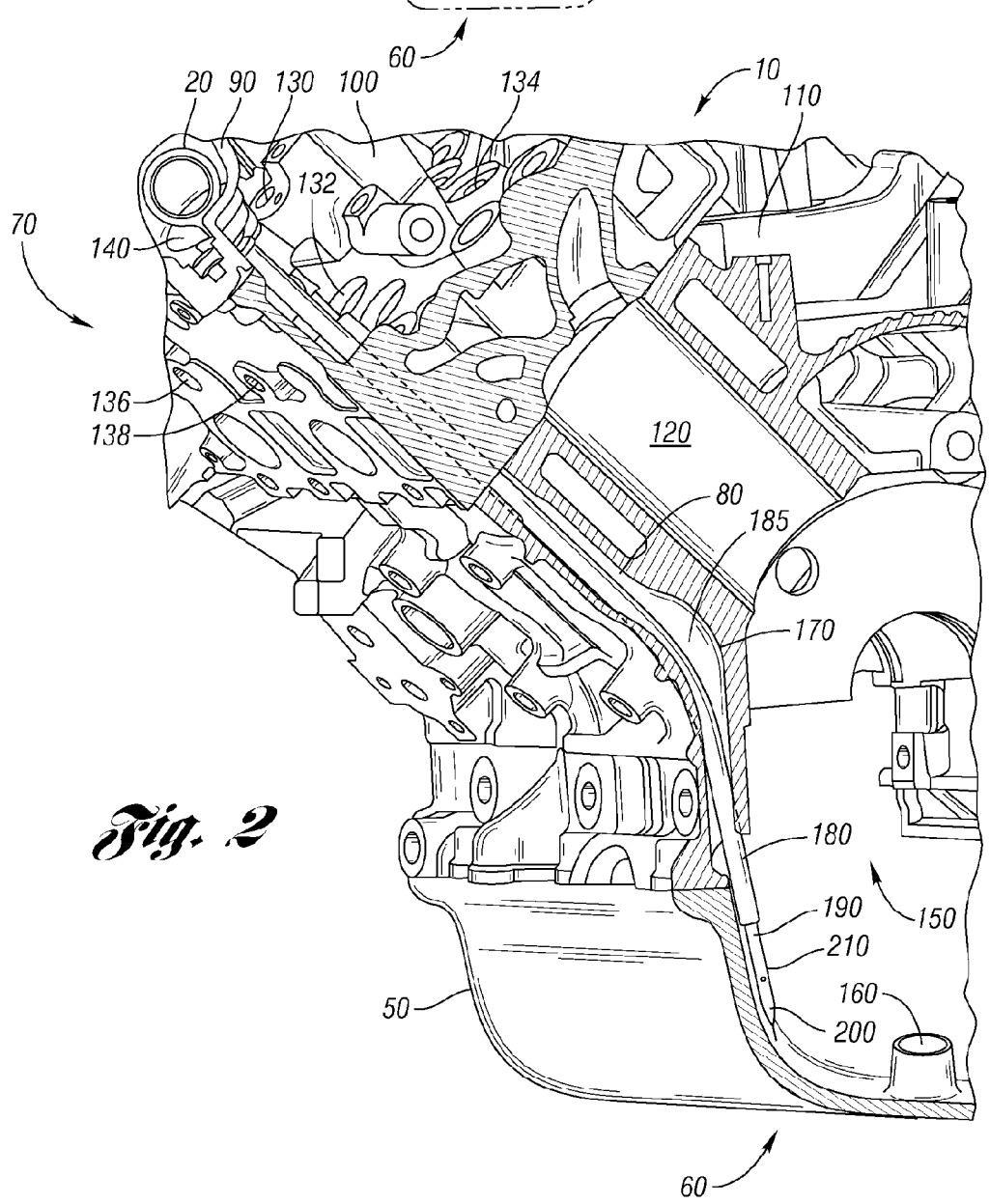
FIG. 2 is a cross-sectional view of a vehicle engine with fluid return channel having a tube therein according to an exemplary embodiment.

The fluid cycles through the engine—to the upper portion 70 of the engine via an engine pump (not shown) and channeled to the base 60 of the engine at least partially through a fluid return channel 80, as shown in FIG. 2. The upper portion 70 of the engine can include the cylinder head, tappet cavity/core, cam cover, oil separators/baffles for crankcase ventilation, etc. The engine can include various fluid return channels (or oil drains) that extend from a cam cover 90, through the cylinder head 100 and cylinder block 110 into the fluid reservoir 50. An adequate amount of fluid must be maintained in the engine to support engine performance. An excessive amount can cause a lack of lubrication due to an inadequate pressure level in the engine. Accordingly, the engine can wear more aggressively, fluid seals can rupture, the engine may be less fuel efficient and/or the engine can overheat. Too little oil can also cause excessive wear and catastrophic failure.

The engine 10 includes a fluid measuring system 20, as partially shown in FIG. 2, configured to assess the fluid level in the engine without detaching the fluid reservoir 50 from the base 60 of the engine. FIG. 2 is a cross-sectional view of the vehicle engine 10 with fluid return channel 80 (or oil "drain back") therein. The engine 10 shown is a V-8 engine. Two sets of cylinder assemblies are mounted approximately at a 90 degree angle with respect to each other. A cylinder block includes eight cylinder bores 120. Atop the cylinder block 110 are cylinder heads 100 on each side of the engine. The cylinder head 100 includes a number of apertures (e.g., 130, 132, 134, 136 and 138) to accommodate various engine components. The cylinder head 100 and cylinder bore 120 include a fluid return channel 80 that functions as an oil drain. The fluid return channel 80 extends from an aperture 140 in the cam cover 90 through the base 150 of the cylinder block to the fluid reservoir 50. Oil is held in the fluid reservoir 50. In one embodiment, the fluid reservoir includes a sensor 160 configured to indicate when the fluid level reaches a predetermined threshold (i.e., when the oil level is too low). Attached to the cylinder head 100 is a cam cover 90.

The fluid return channel 80 includes a bend 170 to accommodate the respective angular position of the cylinder assemblies. As shown in FIG. 2, where the cylinder bores 120 are arranged approximately at a 90 degree angle with respect to each other, the bend 170 in the fluid return channel 80 can be approximately 45 degrees with respect to the base 150 of the cylinder block 110. The bend 170 can vary in degree, for example where the cylinder assemblies are mounted at approximately 60 degrees with respect to each other the bend in the fluid return channel can be less than 45 degrees; where the cylinder assemblies are mounted at a degree greater than 90 with respect to each other, the bend 170 in the fluid return channel 80 can be greater than 45 degrees.

Also shown in FIG. 2 is a fluid measuring system 20 that includes a tube 180 that fits within the fluid return channel 80. The tube 180 extends from the cam cover 90 through the cylinder block 110. The tube 180 is configured to contour the bends in the fluid return channel 80. When the tube 180 is fitted in the fluid return channel 80 an area (e.g., 185) in the fluid return channel is not occupied by the tube such that fluid may freely flow in the fluid return channel 80. The tube 180, as shown in FIG. 2, is fitted in the fluid return channel 80 in a manner that allows fluid to flow via the fluid return channel from an upper portion of an engine 70 to the fluid reservoir 60. In illustrated exemplary embodiment of FIG. 2, the tube 180 is configured so that fluid can flow from an upper portion of the engine 70 to the fluid reservoir 60 while the tube 180 is inserted in the fluid return channel 80. Inside of the tube 180 is a dipstick 190 having a first and second end (as discussed below). The first end 200 of the dipstick comprises a fluid level indicator 210 (or fluid indicator). The fluid indicator 210 is submersed in the fluid in the fluid reservoir when the dipstick 190 is completely inserted in the tube 180. The dipstick 190 and fluid level indicator 210 can be selectively inserted in the engine to take measurements of the fluid level. A fluid level can be read after the dipstick 190 is wiped clean and re-inserted in the tube 180.

Referring now to FIG. 3, a dipstick 300 for use with a fluid measuring system according to an exemplary embodiment is shown therein. The dipstick 300 includes a first member 310 that is attachable to a second member 320. A first end 330 of the dipstick 300 is at the distal end of the dipstick with respect to the cam cover 90 (as shown in FIG. 2). The first end 330 includes a tapered edge 340 (or guide member) that assists in maneuvering the dipstick 300 with respect to the tube 180 (as shown in FIG. 2). The first end 330 of the dipstick includes a set of orifices 350 axially dispersed with respect to the dipstick 300. In one embodiment, the orifices 350 enable an oil film to develop therein. In this manner a fluid level may be determined according to the location of oil films that have successfully formed on the dipstick 300. The first end 330 of the dipstick also includes a series of serrations 360 or crosshatching to capture fluid on the face of the dipstick 300. In this manner the fluid level may also be indicated on the first end 330 of the dipstick.

The first member 310 of the dipstick 300 is shown attached to a second member 320 of the dipstick at 370. In the illustrated embodiment, the first member 310 is attached to the second member 320 via a first and second rivet 380 and 390, respectively. The first and second member 310, 320 may be attached using a number of fasteners, including for example, a welded, pinned, glued or press fit. The second end 400 of the dipstick includes a handle 410 affixed thereto. The handle includes a ring 420 and cylinder 430 that can be attached to the dipstick 300. The handle 410 is nailed onto the dipstick 300 at 440. The handle 410 is made of a polymer and can be injection molded. The first and second members 310, 320 of the dipstick are composed of a metal, such as stainless steel or aluminum. Each member can be stamped or rolled (for example) to specification.

In another embodiment, as shown in FIGS. 4 and 5, a dipstick 450 includes a twisted portion 460. The twisted portion 460 assists in maintaining the structural integrity of the dipstick 450 despite repeated bends in the fluid return channel 80 (as shown in FIG. 2). The dipstick 450 includes a first member 470 that is attachable to a second member 480. The first end 490 includes a tapered edge. The first end 490 of the dipstick also includes a set of orifices 500 axially dispersed with respect to the dipstick 450. The first end 490 of the dipstick further includes a series of serrations 510 or crosshatching to capture fluid on the face of the dipstick 450. In this manner the fluid level may also be indicated on the first end 490 of the dipstick 450.

The first member 470 of the dipstick 450 is twisted with respect to the second member 480 of the dipstick. In the illustrated embodiment, the first member 470 of the dipstick is twisted approximately 540 degrees with respect to the second member 480 of the dipstick. The dipstick 450 can be twisted to a less or greater degree with respect to the second member of the dipstick. The first member 470 is attached to the second member 480 of the dipstick as shown at 550.

In the illustrated embodiment, the first member 470 is attached to the second member 480 via a first and second rivet 560, 570 as also shown in FIG. 7. The connection between the first and second members includes two rivets and a support blade 580. The support blade is tapered at each end. One end of the first member 470 overlaps the distal end of the second member 480 and the support blade 580 is also included in the assembly. Each member has two orifices therein and rivets 560 and 570 are inserted through the orifices and attached to the first and second members 470 and 480, respectively.

The second member 480 of the dipstick 450 includes a handle 590 affixed thereto as also shown in FIG. 6. The second member 480 of the dipstick and handle 590 can be attached or located proximate to an upper portion of the engine 70 (as shown in FIGS. 1 and 2). FIG. 6 shows a top view of the handle 590 according to an exemplary embodiment. The handle 590 includes a ring 600 and cylinder 610 that can be attached to the dipstick. For example, in the illustrated embodiments of FIGS. 4 and 5, the handle 590 is nailed onto the dipstick 450.

In one embodiment, the dipstick 450 includes a guide member 620—such as a tapered edge shown in FIGS. 4 and 5—at the first end 490 of the dipstick. The guide member 620 can also include a circular member such as a sphere that assist a user in navigating the dipstick through the tube. The sphere can be composed of a polymer, resin, metal or other material. The guide member 620 can be formed with the dipstick or attached using various techniques. For example, in one embodiment, the guide member is nailed to the dipstick in a manner similar to the manner in which the handle is secured to the dipstick. In another embodiment the guide member is molded over the dipstick and solidified thereon. The guide member can take various configurations such as a bullet, sphere, anchor or other member.

Referring now to FIGS. 8-11, a tube 800 through which the dipstick may fit is shown. The tube 800 includes an elongated shaft 810 with an opening 820 at one end and a fastener 830 with opening attached at another end. As shown in FIG. 9, the tube includes a fastener 830. The fastener 830 shown therein is a fitting often referred to as a "quick connect." The fastener includes a plurality of prongs (or flexible arms) 840 biased towards the outer radius of the tube 800. The prongs 840 include a jagged edge 850 configured to attach to the fluid return channel 80 (as shown in FIG. 2). The tube 800 includes a shoulder 860. At this end, the tube 800 progressively narrows to the diameter of the tube at the elongated shaft 810 (as shown in FIG. 8). The tube 800 also includes a tapered end 870 to which the fastener is journaled. Other fasteners can also be included on the tube, such as bayonets and clamps.

FIG. 10 illustrates a bottom view of the tube 800 with fastener 830. The radius of the shaft 810 is smaller than the radius of the shoulder 860 of the tube 800. In the illustrated embodiment the prongs 840 do not extend beyond the radius of the shoulder 860 of the tube. FIG. 11 is a cross-section of the tube 800 shown in FIG. 10 across line 11-11. As shown in FIG. 11, the inner and outer diameter of the tube 890 is tapered. The outer diameter of the tube at 900 is smaller than the outer diameter at 910. The tube 800 includes two prongs 840 with jagged edges 850 that function as fasteners to lock against the inner diameter of the aperture in the cam cover 90 that leads to the fluid return channel 80 (as shown in FIG. 2). In one embodiment, the fastener can be attached to the elongated tube 810 via spin welding techniques. Other techniques can be used to attach the fastener to the tube including, for example, vibration welding, press fitting, welding, screwing, snap fitting, riveting, epoxying, cam locking, pinning, bolting, nailing, gluing, etc.

Figure 12:
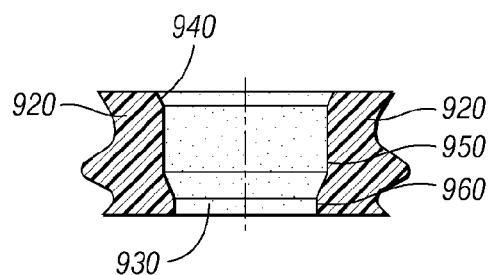
FIG. 12 is a cross-sectional view of a cam cover with aperture in which a tube may fit according to an exemplary embodiment.

FIG. 12 illustrates a cross-section of the top portion of a cam cover 920 with fluid return channel 930 formed therein. The fluid return channel 930 is tapered to mate with the top portion of the tube 800 as shown in FIGS. 8-11. The fluid return channel 930 includes a first diameter 940 configured to fit the shoulder 860 of the tube (as shown in FIG. 9) therein. The fluid return channel 930 also includes a second diameter 950 that is smaller than the first diameter 940. The first diameter 940 is designed so that the shoulder 860 of the tube does not pass the second inner diameter 950 of the fluid return channel 930. The third diameter 960 of the fluid return channel is configured to fit the tube 800 therein. In one embodiment, an o-ring or other seal (not shown) is placed between the cam cover and the tube inserted therein.

The tube 800 is composed of a polymer or polymeric material in one embodiment. The polymer is a nylon-based polyamide (such as Nylon 6) and is resistant to oil or other lubricants. The tube 800 has certain material properties that support its flexibility. For example, in one arrangement the material in which the tube is composed has a modulus of elasticity of 420 ksi, a tensile strength of 14,500 psi, flexural strength of 13,000 psi, and an elongation factor of 60%. The tube 800 is flexible, configured to bend when manually pressed into an engine bore. The tube 800 can also be composed of other elastic-plastic compositions.

The tube 800 can be made of a completely elastic material capable of accommodating the bend radius of various engine designs without kinking or crimping. In another embodiment, the tube 800 is composed of a metallic material such as an aluminum alloy or steel. Those skilled in the art will appreciate that the tube may be composed of various materials including, for example, reinforced nylons, steel alloys, corrosion-resistant materials, etc. Other design properties of the tube can be altered to meet certain performance requirements. The wall thickness of the tube, diameter, mass moment of inertia and other properties can be adjusted to change the flexibility of the tube.

Figure 13:
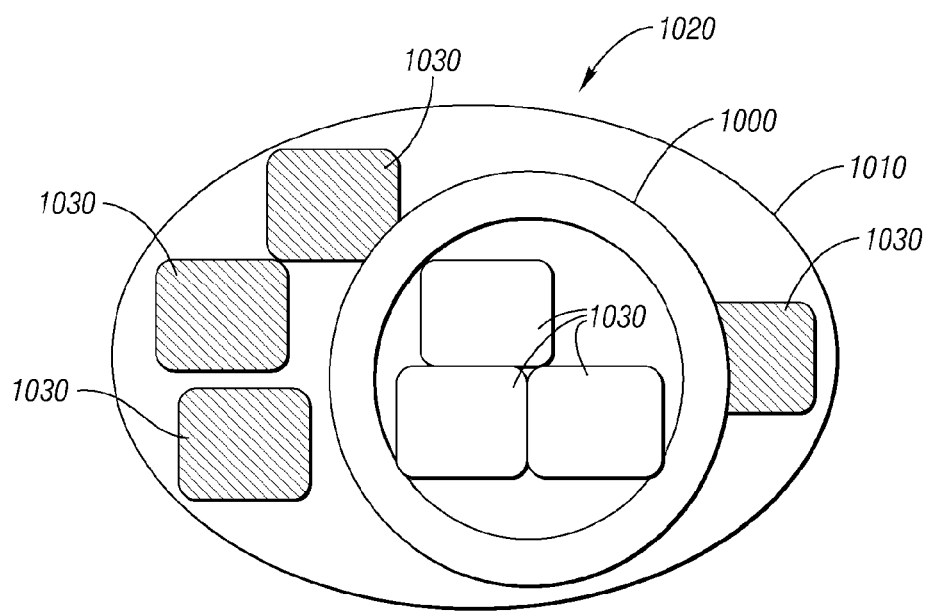
FIG. 13 is a side view of a cam cover showing various positions through which a dipstick may enter the fluid return channel.

As shown in FIG. 13, a tube 1000 is configured to be inserted in a portion of the fluid return channel 1010 that is formed in the cam cover 1020. The tube 1000 assists in guiding the dipstick 1030 down the fluid return channel 1010 to a more repeatable position. For example, as shown in FIG. 13, the dipstick 1030 has a significantly smaller cross-sectional area than the opening of the fluid return channel. Accordingly, without the tube 1000, the dipstick 1030 may enter the fluid return channel 1010 in a greater number of positions. In the embodiment of FIG. 13, the dipstick 1030 can enter the fluid return channel 1010 through seven different positions. With the inclusion of the tube 1000, the dipstick 1030 can be inserted in a limited number of positions (only three as shown in the exemplary embodiment of FIG. 13). Limiting the entering positions of the dipstick 1030 increases the accuracy and precision of fluid level measurements.

Figure 14:
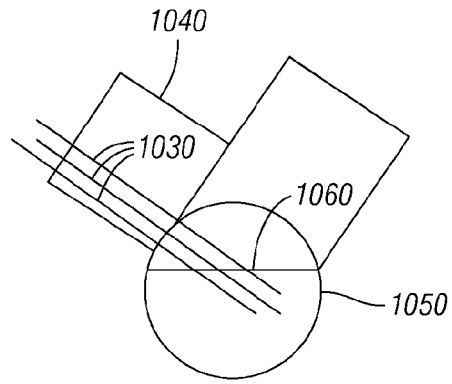
FIG. 14 is a cross-sectional view of the fluid return channel of FIG. 13 showing various corresponding positions in which the dipstick may enter a fluid reservoir.

FIG. 14 is a cross-sectional view of the dipstick 1030, having similar configuration, entering the cylinder block 1040 at multiple positions. Where the dipstick 1030 can move with respect to the fluid reservoir 1050 the oil readings with respect to the fluid level 1060 may vary. Variance can be as great as +/−0.5 quarts. Though the fluid level 1060 is the same for all three measurements, the dipstick 1030 will show different fuel levels as the dipstick enters the fluid reservoir at different positions. The tube 1000 that is inserted in the fluid return channel 1010, as shown for example in FIG. 13, is configured to guide the dipstick 1030 into substantially the same position during multiple reinsertions of the dipstick therein.

Figure 15:
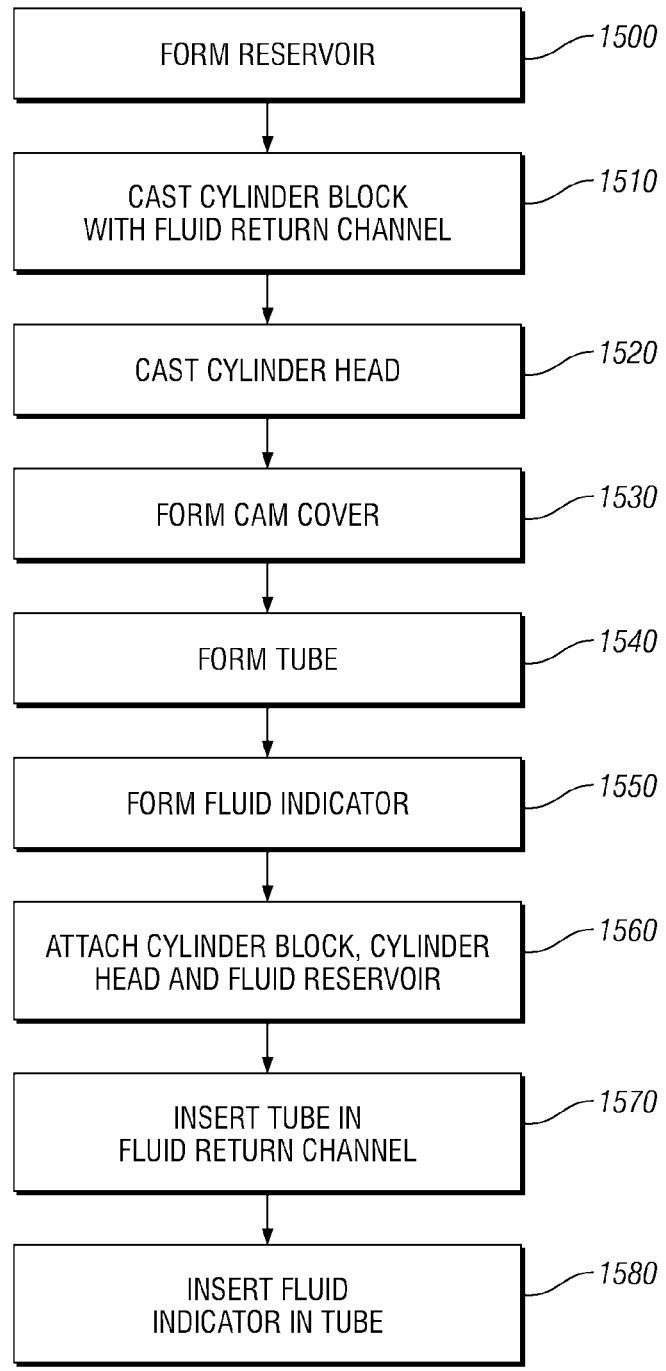
FIG. 15 is flow diagram of a method of manufacturing a vehicle engine according to an exemplary embodiment.

A method of manufacturing a vehicle engine with fluid measuring system is shown in FIG. 15. The method includes forming a fluid reservoir (as shown for example in FIG. 2) 1500. The method further includes die casting a cylinder block having a portion of a fluid return channel formed therein as shown at 1510 and die casting a cylinder head having a portion of the fluid return channel formed therein at 1520. The method further includes forming a cam cover with an orifice configured to be in fluid communication with a portion of the fluid return channel 1530. The method includes forming a tube configured to fit inside of the fluid return channel 1540, forming a fluid indicator configured to fit inside of the tube 1550, attaching the cylinder block with the cylinder head and fluid reservoir 1560, inserting the tube in the fluid return channel 1570 and inserting the fluid indicator in the tube 1580. In one embodiment, steps 1570 and 1580 are combined and performed simultaneously. The tube and fluid indicator can be driven into the fluid return channel via a hammer or mallet. The components of the engine may be formed via any number of techniques. For example the parts may be die cast, stamped, extruded, injection molded, drilled, welded together, etc.

The fluid return channel can be located in various locations with respect to the cylinder head and cylinder block. In the illustrated embodiments, the fluid return channel is shown running adjacent a cylinder bore. In another embodiment, the fluid return channel is located in the middle section of the cylinder head and cylinder block, between the cylinders. In another embodiment, the fluid return channel is located proximate a rear drain located at another end of the engine. Those skilled in the art will appreciate that the fluid return channel can run through either the cylinder head, cylinder block or other engine components independently.

In another embodiment, the forming of the tube includes extruding the tube. In another exemplary embodiment, the method includes forming a fastener attachable to the tube. The fastener is injection molded. The method includes spin welding the fastener to the tube. The method can also include forming a guide at one end of the fluid indicator. In another embodiment, the method includes forming the fluid return channel to include an angle of at least 45 degrees.

The invention has been described with reference to certain aspects. These aspects and features illustrated in the drawings can be employed alone or in combination. Modifications and alterations will occur to others upon a reading and understanding of this specification. Although the described aspects discuss plastic as one material of construction, it is understood that other materials can be used for selected components if so desired. It is understood that mere reversal of components that achieve substantially the same function and result are contemplated, e.g., guiding of a dipstick via a tube can be achieved by differently configurations without departing from the present invention. It is intended to include all such modifications and alterations insofar as they come within the scope of the appended claims or the equivalents thereof.

While several examples for carrying out the invention have been described, those familiar with the art to which this invention relates will recognize alternative designs and embodiments for practicing the invention. Thus, the above-described embodiments are intended to be illustrative of the invention, which may be modified within the scope of the following claims.

We claim:

1. A fluid measuring system for use in a vehicle engine, comprising:
 a fluid return channel configured to guide fluid from an upper portion of an engine to a fluid reservoir;
 a tube fitted in the fluid return channel and configured to continuously extend from a top of the upper portion of the engine to the fluid reservoir; and
 a dipstick having a first and second end, wherein the first end of the dipstick comprises a fluid indicator and wherein the dipstick is configured to fit in the tube;
 wherein the engine includes a plurality of cylinder assemblies, mounted in a v-shaped arrangement; and
 wherein the tube has a modulus of elasticity between 0.1 ksi and 20,000 ksi.

2. The system of claim 1, wherein the tube has a flexural strength between 5,000 psi and 40,000 psi.

3. The system of claim 1, wherein the tube is at least partially composed of an elastic material.

4. The system of claim 3, wherein the tube is composed of an elastic plastic material.

5. The system of claim 1, wherein the tube is composed of a polymeric material.

6. The system of claim 5, wherein the tube is composed of a nylon-based polymeric material.

7. The system of claim 1, wherein the tube is composed of a metallic material.

8. The system of claim 1, wherein the tube includes a first and second end and wherein the second end includes a fastener secured to an engine cam cover.

9. A fluid measuring system, comprising:
 a v-type internal combustion engine;

a channel bore in the engine, the channel in fluid communication with a fluid reservoir;

a tube configured to fit in the channel, wherein the tube is configured to continuously extend from a top of an upper portion of the engine to the fluid reservoir; and a dipstick configured to be inserted in the tube, wherein the dipstick includes an indicator of fluid level at one end, wherein the tube has a modulus of elasticity between 0.1 ksi and 20,000 ksi.

10. The system of claim 9, wherein the tube is at least partially composed of an elastic material.

11. The system of claim 10, wherein the tube is composed of an elastic plastic material.

12. The system of claim 9, wherein the tube is composed of a polymeric material.

13. The system of claim 12, wherein the tube is composed of a nylon-based polymeric material.

14. The system of claim 9, wherein the tube is composed of a metallic material.

15. A fluid measuring system, comprising:

a v-type internal combustion engine;

a channel bore in the engine, the channel in fluid communication with a fluid reservoir;

a tube configured to fit in the channel, wherein the tube is configured to continuously extend from a top of an upper portion of the engine to the fluid reservoir; and a dipstick configured to be inserted in the tube, wherein the dipstick includes an indicator of fluid level at one end, wherein the tube has a flexural strength between 5,000 psi and 40,000 psi.

* * * * *